(12) United States Patent
Sato

(10) Patent No.: US 7,401,987 B2
(45) Date of Patent: Jul. 22, 2008

(54) PHOTOGRAPHING LENS HAVING AN ECCENTRICITY ADJUSTING DEVICE

(75) Inventor: Norio Sato, Tokyo (JP)

(73) Assignee: Hoya Corporation, Tokyo (JP)

( * ) Notice: Subject to any disclaimer, the term of this patent is extended or adjusted under 35 U.S.C. 154(b) by 506 days.

(21) Appl. No.: 11/213,769

(22) Filed: Aug. 30, 2005

(65) Prior Publication Data

US 2006/0045502 A1    Mar. 2, 2006

(30) Foreign Application Priority Data

Sep. 2, 2004    (JP)    ............................. 2004-256335

(51) Int. Cl.
G03B 17/00    (2006.01)
(52) U.S. Cl. ........................... 396/529; 396/73; 396/91; 396/144; 359/441; 359/694; 359/703; 359/704; 359/822; 359/819; 359/738; 359/739; 359/740; 348/373; 348/374; 348/375; 348/376; 348/335
(58) Field of Classification Search .............. 396/73.91, 396/144, 529; 359/441, 694, 703, 704, 822, 359/738–740; 348/335, 373–376
See application file for complete search history.

(56) References Cited

U.S. PATENT DOCUMENTS

| | | | | |
|---|---|---|---|---|
| 4,769,711 A | * | 9/1988 | Date | ........................... 348/374 |
| 5,313,238 A | * | 5/1994 | Kelley | ........................ 396/144 |
| 5,687,032 A | * | 11/1997 | Takeshita et al. | ............ 359/822 |
| 5,832,326 A | | 11/1998 | Tanaka | |
| 6,204,979 B1 | * | 3/2001 | Matsui | ........................ 359/819 |
| 6,397,009 B1 | * | 5/2002 | Ito et al. | ........................ 396/79 |
| 2002/0135896 A1 | | 9/2002 | Nomura et al. | |
| 2003/0081325 A1 | | 5/2003 | Nomura et al. | |
| 2003/0081327 A1 | | 5/2003 | Nomura et al. | |
| 2003/0156832 A1 | | 8/2003 | Nomura et al. | |

FOREIGN PATENT DOCUMENTS

JP    6-82612    11/1994

* cited by examiner

*Primary Examiner*—W. B. Perkey
*Assistant Examiner*—Michael A Strieb
(74) *Attorney, Agent, or Firm*—Greenblum & Bernstein, P.L.C.

(57) ABSTRACT

A photographing lens includes an eccentricity adjusting frame which holds an eccentricity adjusting lens group serving as a part of a photographing optical system of the photographing lens; a lens support frame, an axis of which is coincident with a predetermined optical axis of the photographing optical system, supporting the eccentricity adjusting frame in a manner to allow the eccentricity adjusting frame to move in a plane orthogonal to the predetermined optical axis during an assembly-stage of the photographing lens; and a fixed aperture member having a circular aperture, the fixed aperture member being integrally formed with the lens support frame so that a center of the circular aperture coincides with the axis of the lens support frame.

10 Claims, 6 Drawing Sheets

PHOTOGRAPHING LENS HAVING AN ECCENTRICITY ADJUSTING DEVICE

BACKGROUND OF THE INVENTION

1. Field of the Invention

The present invention relates to a photographing lens having an eccentricity adjusting device for adjusting the position of part of the lens groups constituting a photographing optical system in a plane orthogonal to an optical axis, in an adjustment operation during assembly of the photographing lens.

2. Description of the Related Art

This type of eccentricity adjusting device incorporated in a photographing lens is used to adjust the inclination of an image plane. Specifically, in digital cameras using a CCD image sensor on which object images are formed, it is required to adjust the inclination of the image plane with a higher degree of precision than conventional cameras using silver-salt film due to the characteristics of the CCD image sensor. The first lens group (frontmost lens group) of a photographing lens, which is positioned closest to the object side, is generally adopted as an eccentricity adjusting lens group for adjusting the inclination of the image plane. The inclination of the image plane can be adjusted by decentering the optical axis of the eccentricity adjusting lens group from the predetermined optical axis determined at the design stage of the photographing optical system.

However, if an eccentricity adjustment is made on the first lens group (eccentricity adjusting lens group), a problem with the amount of light on the image plane becoming uneven arises. If the brightness on the image plane becomes uneven, shading occurs in digital cameras using an image pickup device (CCD image sensor) on which object images are formed, which is undesirable.

SUMMARY OF THE INVENTION

The present invention provides a photographing lens having an eccentricity adjusting device which makes it possible to prevent the amount of light on an image plane from varying, specifically prevent the brightness on the image plane from becoming uneven, even if the eccentricity adjustment is made on the eccentricity adjusting lens group.

According to an aspect of the present invention, a photographing lens is provided, including an eccentricity adjusting frame which holds an eccentricity adjusting lens group serving as a part of a photographing optical system of the photographing lens; a lens support frame, an axis of which is coincident with a predetermined optical axis of the photographing optical system, supporting the eccentricity adjusting frame in a manner to allow the eccentricity adjusting frame to move in a plane orthogonal to the predetermined optical axis during an assembly-stage of the photographing lens; and a fixed aperture member having a circular aperture, the fixed aperture member being integrally formed with the lens support frame so that a center of the circular aperture coincides with the axis of the lens support frame.

It is desirable for the fixed aperture member and the lens support frame to be provided as separate members, and for the fixed aperture member to be fixed to the lens support frame.

It is desirable for the fixed aperture member and the lens support frame to be molded in one body.

It is desirable for the photographing lens includes a zoom lens, wherein the eccentricity adjusting lens group includes a first lens group of the photographing optical system, and the lens support frame includes a first lens group support frame which supports the first lens group and which moves in the optical axis direction in a zooming operation of the zoom lens.

It is desirable for the lens support frame and the eccentricity adjusting frame to include a first orthogonal surface and a second orthogonal surface which face each other in the optical axis direction, respectively, and to be biased in opposite directions to keep the first orthogonal surface and the second orthogonal surface in contact with each other.

The photographing lens can include a biasing member, fixed to the lens support frame, for biasing the first orthogonal surface and the second orthogonal surface in the opposite directions.

It is desirable for the fixed aperture member to be in the shape of a plate which lies in a plane orthogonal to the optical axis.

The photographing lens can include a shutter unit positioned behind the fixed aperture member adjacent thereto.

It is desirable for the eccentricity adjusting lens group to be screw-engaged in the eccentricity adjusting frame so that a position of the eccentricity adjusting lens group relative to the eccentricity adjusting frame in the optical axis direction can be adjusted by rotating the eccentricity adjusting lens group relative to the eccentricity adjusting frame in an adjusting operation during assembly of the zoom lens.

In an embodiment, a photographing lens is provided, including a lens holder which holds a frontmost lens group of a photographing optical system; a lens-holder support frame which supports the lens holder in a manner to allow the lens holder to move in a plane orthogonal to an optical axis of the photographing optical system during an assembly-stage of the photographing lens, the lens holder and the lens-holder support frame being concentrically arranged; and a fixed aperture member having a circular aperture, the fixed aperture member being integrally formed with the lens-holder support frame so that a center of the circular aperture coincides with an axis of the lens-holder support frame.

According to the present invention, a photographing lens is achieved wherein the brightness of the edge of the image plane does not easily become uneven even if the eccentricity adjustment is made to the eccentricity adjusting lens group and further wherein shading does not easily occur even if the eccentricity adjusting device is used in a digital camera.

The present disclosure relates to subject matter contained in Japanese Patent Application No.2004-256335 (filed on Sep. 2, 2004) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

FIGS. 1 through 5 show an embodiment of a zoom lens having an eccentricity adjusting device according to the present invention. The overall structure of the zoom lens 10 will be discussed hereinafter.

Figure 1:
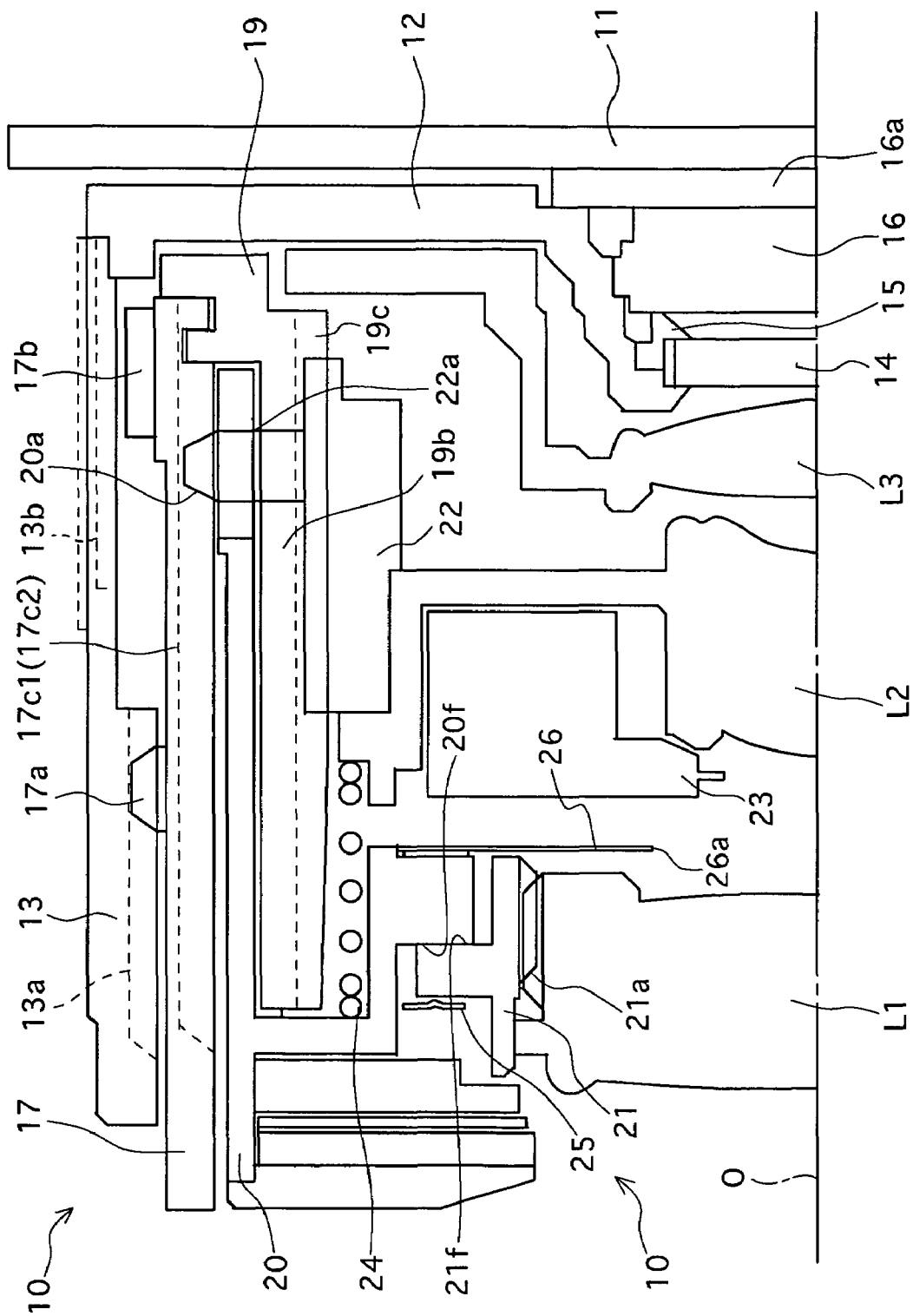
FIG. 1 is a longitudinal sectional view of an embodiment of a zoom lens having an eccentricity adjusting device according to the present invention, showing only an upper half of the zoom lens from the optical axis thereof in an accommodated state (fully-retracted state) of the zoom lens.
Figure 2:
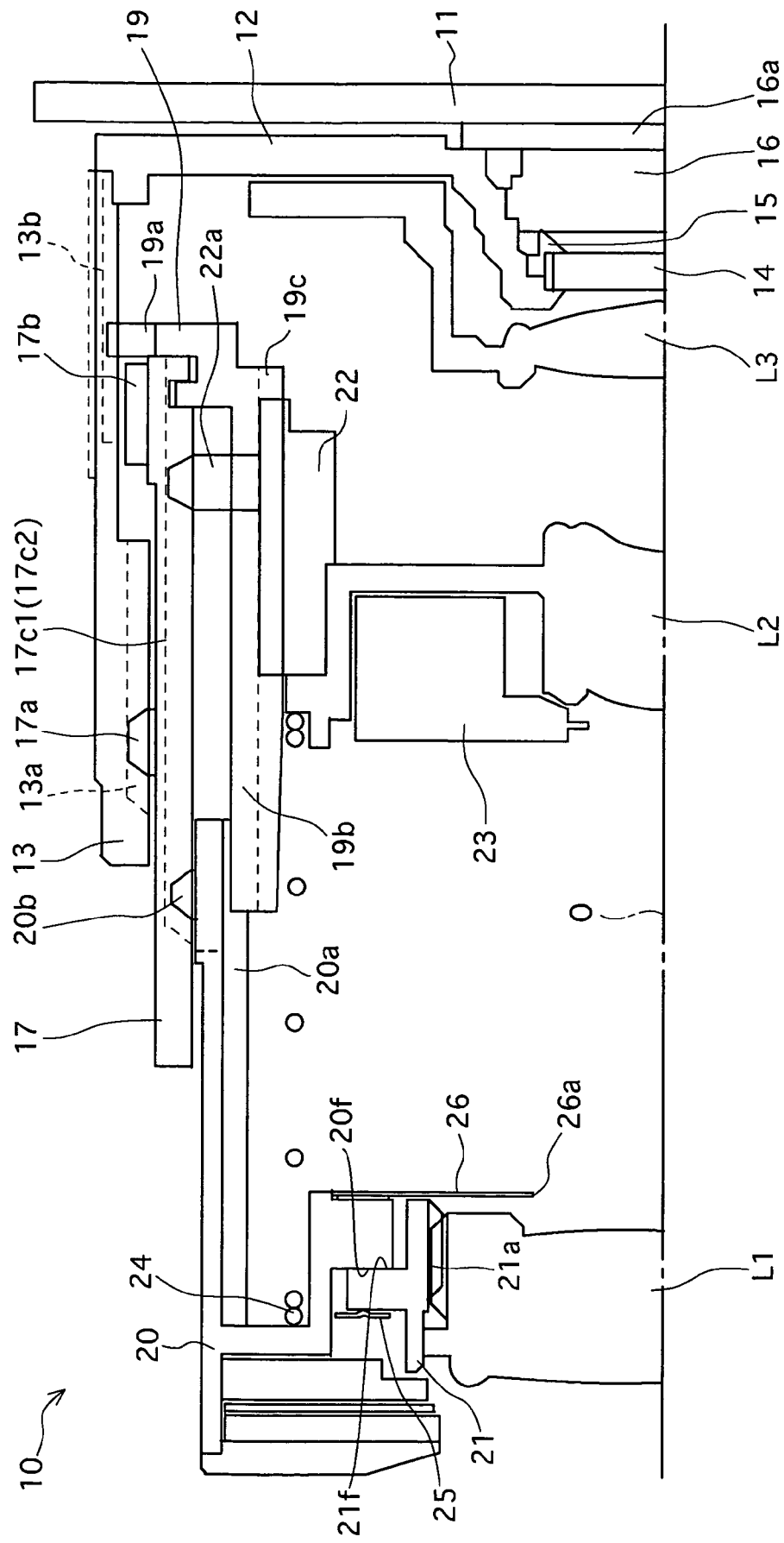
FIG. 2 is a longitudinal sectional view of the zoom lens shown in FIG. 1, showing only an upper half of the zoom lens from the optical axis thereof in a state where the zoom lens is set at a shortest focal length thereof.
Figure 3:
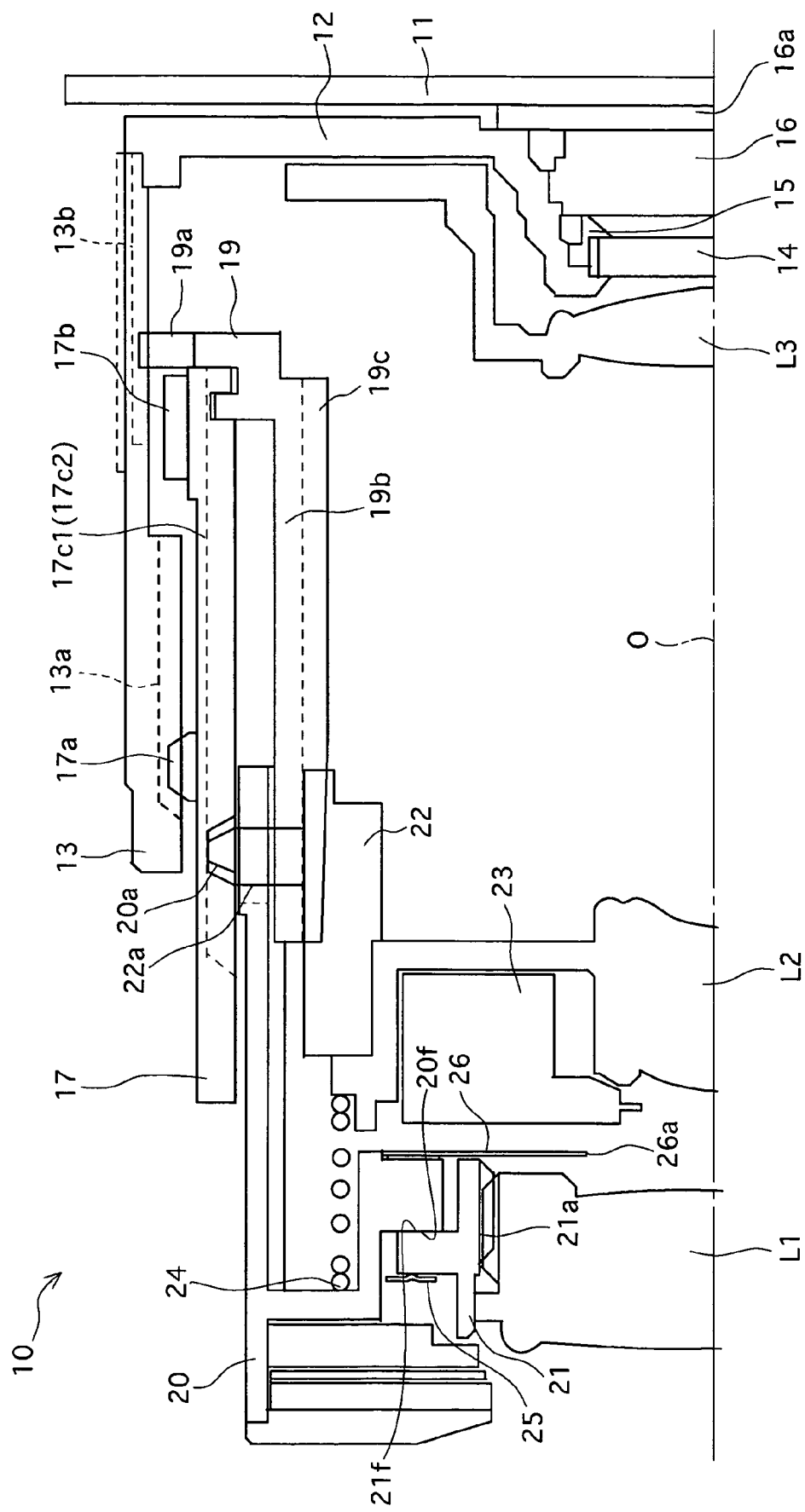
FIG. 3 is a longitudinal sectional view of the zoom lens shown in FIG. 1, showing only an upper half of the zoom lens from the optical axis thereof in a state where the zoom lens is set at a longest focal length thereof.

The zoom lens 10 is provided at the back thereof with a main board 11, and is further provided with a stationary barrel 13 and a CCD substrate 16a which are fixed to the main board 11. The zoom lens 10 is provided in front of the main board 11 with a CCD fixing member 12. The zoom lens 10 is provided between the CCD substrate 16a and the CCD fixing member 12 with a low-pass optical filter 14, a sealing member 15 and a CCD image sensor 16, in that order from the front side (left side as shown in FIGS. 1 through 3) of the zoom lens 10, which are fixed to the CCD substrate 16a by the CCD fixing member 12. All the above described elements of the zoom lens 10 are fixed elements which are immovable during a zooming operation of the zoom lens 10.

Figure 5:
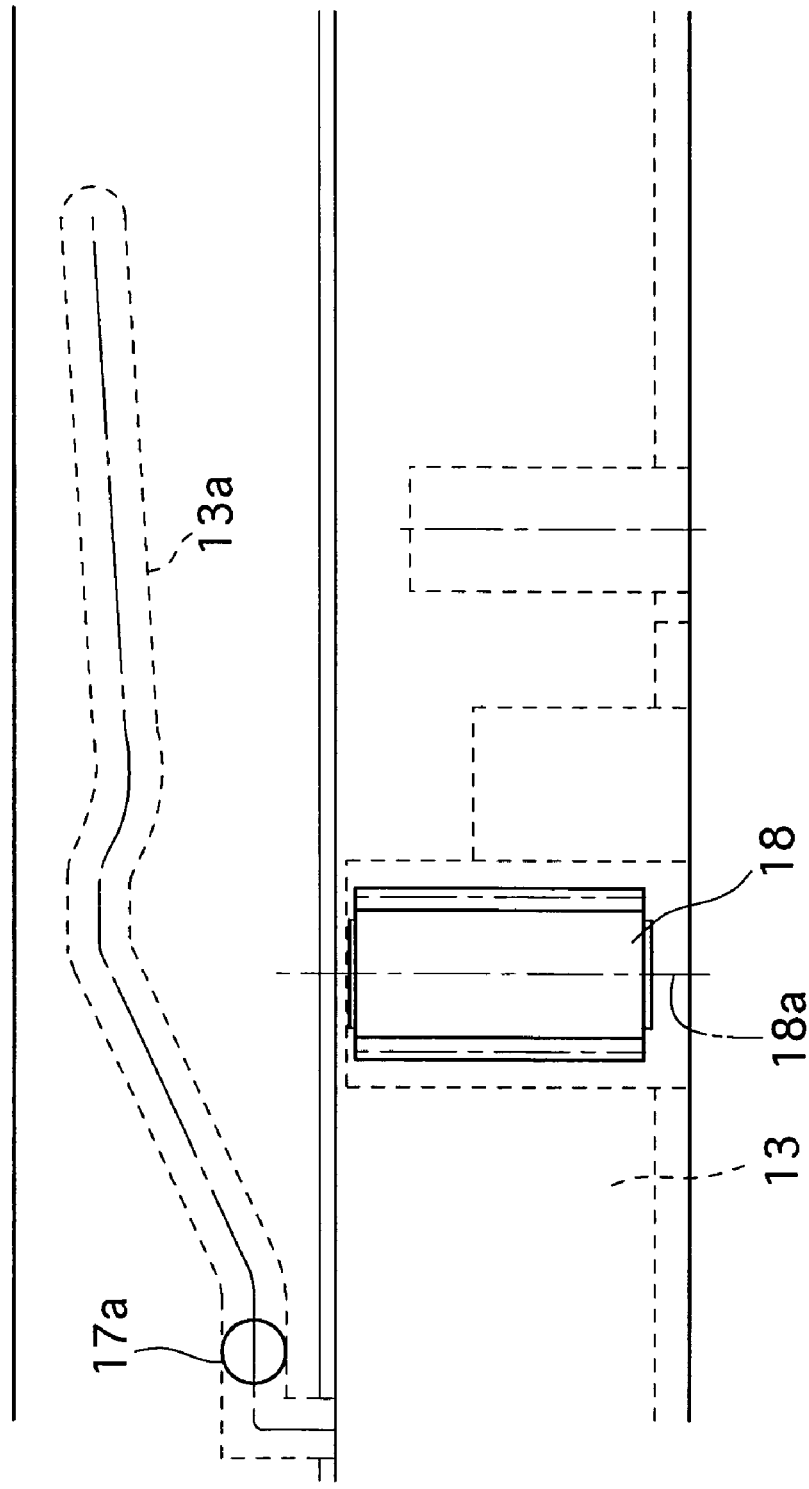
FIG. 5 is a developed view of a stationary barrel of the zoom lens shown in FIGS. 1 through 3 in relation to a pinion gear and a cam follower of the rotatable cam ring.

The zoom lens 10 is provided with a plurality of ring members (barrel members), and among these ring members the stationary barrel 13 is the radially outermost ring member. The stationary barrel 13 is provided on an inner peripheral surface thereof with a plurality of cam grooves 13a (generally three cam grooves 13a arranged at equi-angular intervals) and a plurality of linear guide grooves 13b (generally three linear guide grooves 13b arranged at equi-angular intervals) extending in a direction parallel to a photographing optical axis O. Only one of the plurality of cam grooves 13a is shown in FIG. 5. The zoom lens 10 is provided radially inside of the stationary barrel 13 with a cam ring 17 positioned coaxially with the stationary barrel 13 to be freely rotatable about the photographing optical axis O.

The cam ring 17 is provided on an outer peripheral surface thereof with a plurality of cam followers 17a which are engaged in the plurality of cam grooves 13a of the stationary barrel 13, respectively. The cam ring 17 is provided, on an outer peripheral surface thereof in the vicinity of the rear end of the cam ring 17, with a spur gear 17b. A pinion gear 18 (see FIG. 5) which is supported by the stationary barrel 13 is in mesh with the spur gear 17b. The axis 18a of the pinion gear 18 extends parallel to the photographing optical axis O. The zoom lens 10 is provided radially inside the cam ring 17 with a linear guide ring 19 (see FIG. 2) which is concentrically connected to the cam ring 17 to move together with the cam ring 17 in the optical axis direction while allowing the cam ring 17 to rotate freely about the optical axis O relative to the linear guide ring 19.

The linear guide ring 19 is provided with a plurality of linear guide projections 18a which project radially outwards to be engaged in the plurality of linear guide grooves 13b of the stationary barrel 13, respectively. Due to this engagement of the plurality of linear guide projections 19a with the plurality of linear guide grooves 13b, rotating the pinion gear 18 forward and reverse cause the cam ring 17 to rotate forward and reverse via the spur gear 17b, thus causing the cam ring 17 to move forward and rearward in the optical axis direction in accordance with engagement of the plurality of cam followers 17a with the plurality of cam grooves 13a. At the same time, the linear guide ring 19 moves together with the cam ring 17 in the optical axis direction while the cam ring 17 rotates relative to the linear guide ring 19.

Figure 4:
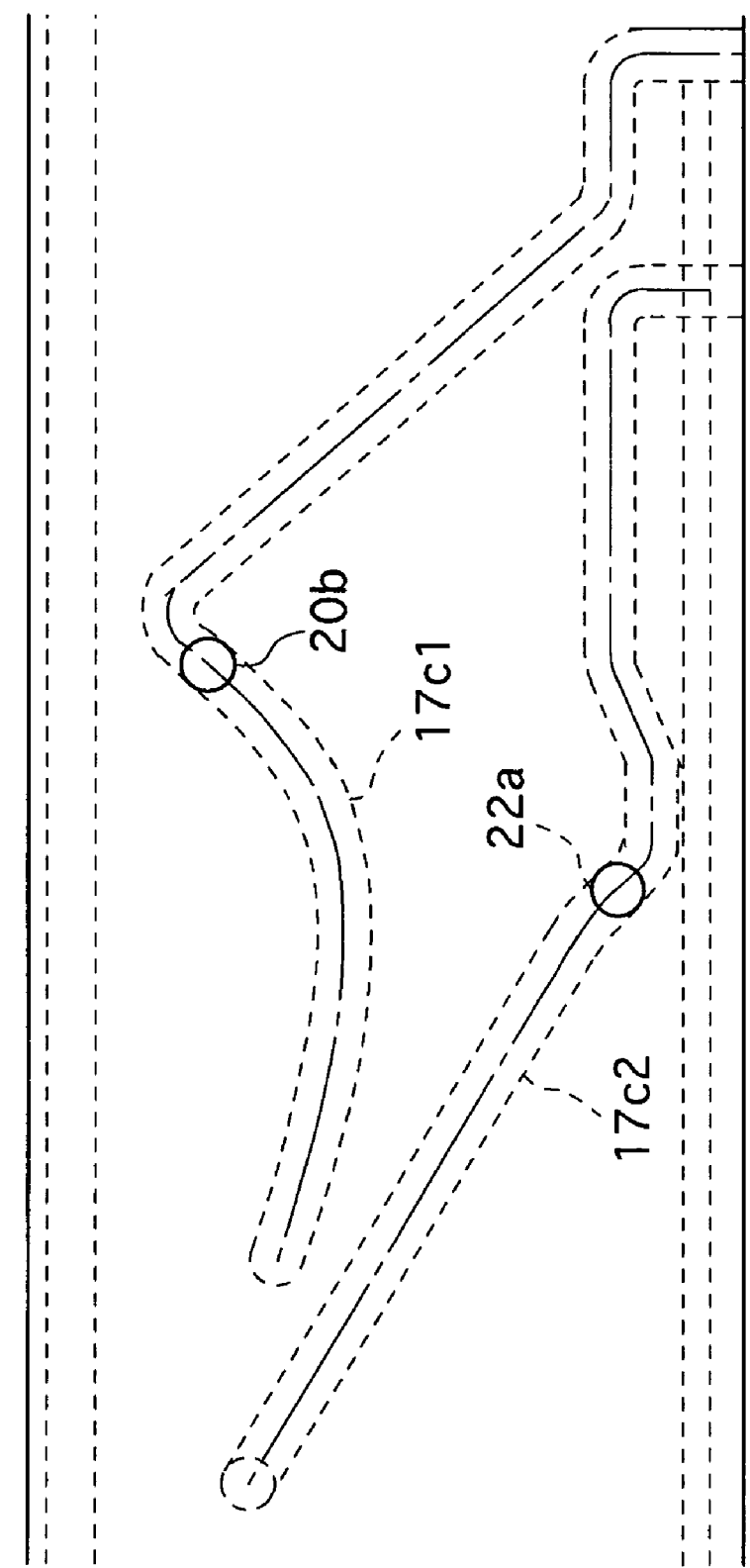
FIG. 4 is a developed view of a rotatable cam ring of the zoom lens shown in FIGS. 1 through 3.

The cam ring 17 is provided on an inner peripheral surface thereof with a plurality of first-lens-group driving cam grooves 17c1 (generally three first-lens-group driving cam grooves 17c1 arranged at equi-angular intervals; only one of them is shown in FIG. 4) and a plurality of second-lens-group driving cam grooves 17c2 (generally three second-lens-group driving cam grooves 17c2 arranged at equi-angular intervals; only one of them is shown in FIG. 4). The zoom lens 10 is provided between the cam ring 17 and the linear guide ring 19 with a cylindrical first lens group support frame (lens support frame) 20 which indirectly supports a first lens group L1. The first lens group support frame 20 is guided linearly in the optical axis direction by linear guide elements 19b and 20a of a linear guide mechanism provided between the linear guide ring 19 and the first lens group support frame 20. The first lens group support frame 20 is provided on an outer peripheral surface thereof with a plurality of cam followers 20b which are engaged in the plurality of first-lens-group driving cam grooves 17c1 of the cam ring 17, respectively. Forward and reverse rotations of the cam ring 17 cause the first lens group support frame 20 to move forward and rearward linearly in the optical axis direction, respectively, in accordance with contours of the plurality of first-lens-group driving cam grooves 17c1. The zoom lens 10 is provided around the first lens group L1 with an eccentricity adjusting frame 21 which supports the first lens group L1. The first lens group L1 serves as an eccentricity adjusting lens group for adjusting the inclination of an image plane.

The zoom lens 10 is provided radially inside the linear guide ring 19 with a second lens group support frame 22 which supports a second lens group L2. The linear guide ring 19 is provided on an inner peripheral surface thereof with a plurality of linear guide grooves 19c extending parallel to the optical axis O, and the second lens group support frame 22 is slidably engaged in the plurality of linear guide grooves 19c to be guided linearly in the optical axis direction. The zoom lens 10 is provided with a shutter unit 23, and both the second lens group L2 and the shutter unit 23 are fixed to the second lens group support frame 22. The second lens group support frame 22 is provided on an outer peripheral surface thereof with a plurality of cam followers 22a which are engaged in the plurality of second-lens-group driving cam grooves 17c2 of the cam ring 17, respectively. Forward and reverse rotations of the cam ring 17 cause the second lens group support frame 22 to move forward and rearward linearly in the optical axis direction, respectively, in accordance with contours of the plurality of second-lens-group driving cam grooves 17c2. The zoom lens 10 is provided between the first lens group support frame 20 and the second lens group support frame 22 with a compression coil spring 24 having a truncated conical shape which biases the first lens group support frame 20 and the second lens group support frame 22 in directions away from each other in the optical axis direction to remove backlash between the plurality of second-lens-group driving cam grooves 17c2 and the plurality of cam followers 22a.

A third lens group L3, which is positioned behind the second lens group L2, serves as a focusing lens group which is driven in the optical axis direction by a drive mechanism (not shown) to perform a focusing operation in accordance with object distance information.

In the zoom lens 10 that has the above described structure, driving the pinion gear 18 forward and reverse cause the cam ring 17 to move forward and rearward in the optical axis direction while rotating, respectively, which in turn cause the first lens group support frame 20 (the first lens group L1) and the second lens group support frame 22 (the second lens group L2) to move forward and rearward in the optical axis direction, respectively, to perform a zooming operation or a zoom lens retracting operation. The contours of the plurality of cam grooves 13a of the cam ring 13 are determined so as to provide a smooth zooming operation and a smooth zoom lens retracting operation while taking into consideration the contours of the plurality of first-lens-group driving cam grooves 17c1 and the plurality of second-lens-group driving cam grooves 17c2.

The above described concentrically arranged ring members of the zoom lens 10, i.e., the stationary barrel 13, the cam ring 17, the first lens group support frame 20, the linear guide ring 19 and the second lens group support frame 22 have a common axis coincident with a predetermined optical axis determined at the design stage (the photographing optical axis O) of the photographing optical system of the zoom lens 10.

In contrast to these concentrically arranged ring members, the position of the eccentricity adjusting frame 21 that supports the first lens group L1 can be adjusted on a plane orthogonal to the predetermined optical axis (the photographing optical axis O) in an adjustment operation during assembly of the zoom lens 10. Specifically, the first lens group support frame 20 and the eccentricity adjusting frame 21 are provided with a first orthogonal surface 20f and a second orthogonal surface 21f which face each other in the optical axis direction, respectively, and are biased by an annular leaf spring 25 in opposite directions to keep the first orthogonal surface 20f and the second orthogonal surface 21f in contact with each other. The annular leaf spring 25 is supported by the first lens group support frame 20. A slight radial clearance is provided between the first lens group support frame 20 and the eccentricity adjusting frame 21 so that the position of the eccentricity adjusting frame 21 can be adjusted to some extent relative to the first lens group support frame 20 in a plane orthogonal to the photographing optical axis O with the first orthogonal surface 20f and the second orthogonal surface 21f remaining in contact with each other. The zoom lens 10 is provided behind the eccentricity adjusting frame 21 (the first lens group L1) with a fixed aperture plate (fixed aperture member) 26 which is formed as an independent member separate from the eccentricity adjusting frame 21. The fixed aperture plate 26 is bonded to the first lens group support frame 20. The fixed aperture plate 26 is provided at a center thereof with a circular aperture 26a having its center on the predetermined optical axis (the photographing optical axis O) of the photographing optical system of the zoom lens 10. The circular aperture 26a restricts the cross sectional shape of an optical path of the photographing optical system of the zoom lens 10 to a circular cross sectional shape having its center on the predetermined optical axis (the photographing optical axis O) of the photographing optical system of the zoom lens 10 regardless of any adjustment made to the position of the eccentricity adjusting frame 21 (the first lens group L1).

Accordingly, in the zoom lens 10 that incorporates the above described eccentricity adjusting device, the inclination of an image plane can be adjusted by adjusting the position of the eccentricity adjusting frame 21 (the first lens group L1/eccentricity adjusting lens group) in a plane orthogonal to the photographing optical axis O with the first orthogonal surface 20f and the second orthogonal surface 21f remaining in contact with each other while the inclination of the image plane is adjusted.

In conventional zoom lenses having an eccentricity adjusting device, as a result of such an eccentricity adjusting operation, the center of a light bundle passing through the first lens group L1 becomes eccentric to the predetermined optical axis (the photographing optical axis O) of the photographing optical system of the zoom lens 10, which may cause the brightness of the edge of the image plane to become uneven. However, in the present embodiment of the zoom lens, the brightness of the edge of the image plane can be prevented from becoming uneven while shading can be prevented from occurring on the CCD image sensor 16 because the fixed aperture plate 26, which restricts the cross sectional shape of an optical path of the photographing optical system of the zoom lens 10 to a circular cross sectional shape having its center on the predetermined optical axis (the photographing optical axis O) of the photographing optical system of the zoom lens 10 without regard to an adjustment made to the position of the eccentricity adjusting frame 21 (the first lens group L1), is fixed to the first lens group support frame 20.

In the above illustrated embodiment of the zoom lens, the first lens group L1 (a fixing frame thereof) and the eccentricity adjusting frame 21 are provided on outer and inner peripheral surfaces thereof with male and female screw threads 21a, respectively, which are engaged with each other so that the position of the first lens group L1 relative to the eccentricity adjusting frame 21 in the optical axis direction can be adjusted by rotating the first lens group L1 relative to the eccentricity adjusting frame 21 in an adjusting operation during assembly of the zoom lens. This adjusting operation (assembly-stage focus adjustment operation) is performed to prevent the focal point from changing during a zooming operation. Upon completion of the eccentricity adjusting operation, the eccentricity adjusting frame 21 and the first lens group support frame 20 are fixed to each other by, e.g., an adhesive. Upon completion of the assembly-stage focus adjustment operation, the male and female screw threads 21a of the first lens group L1 and the eccentricity adjusting frame 21 are bonded to each other.

Figure 6:
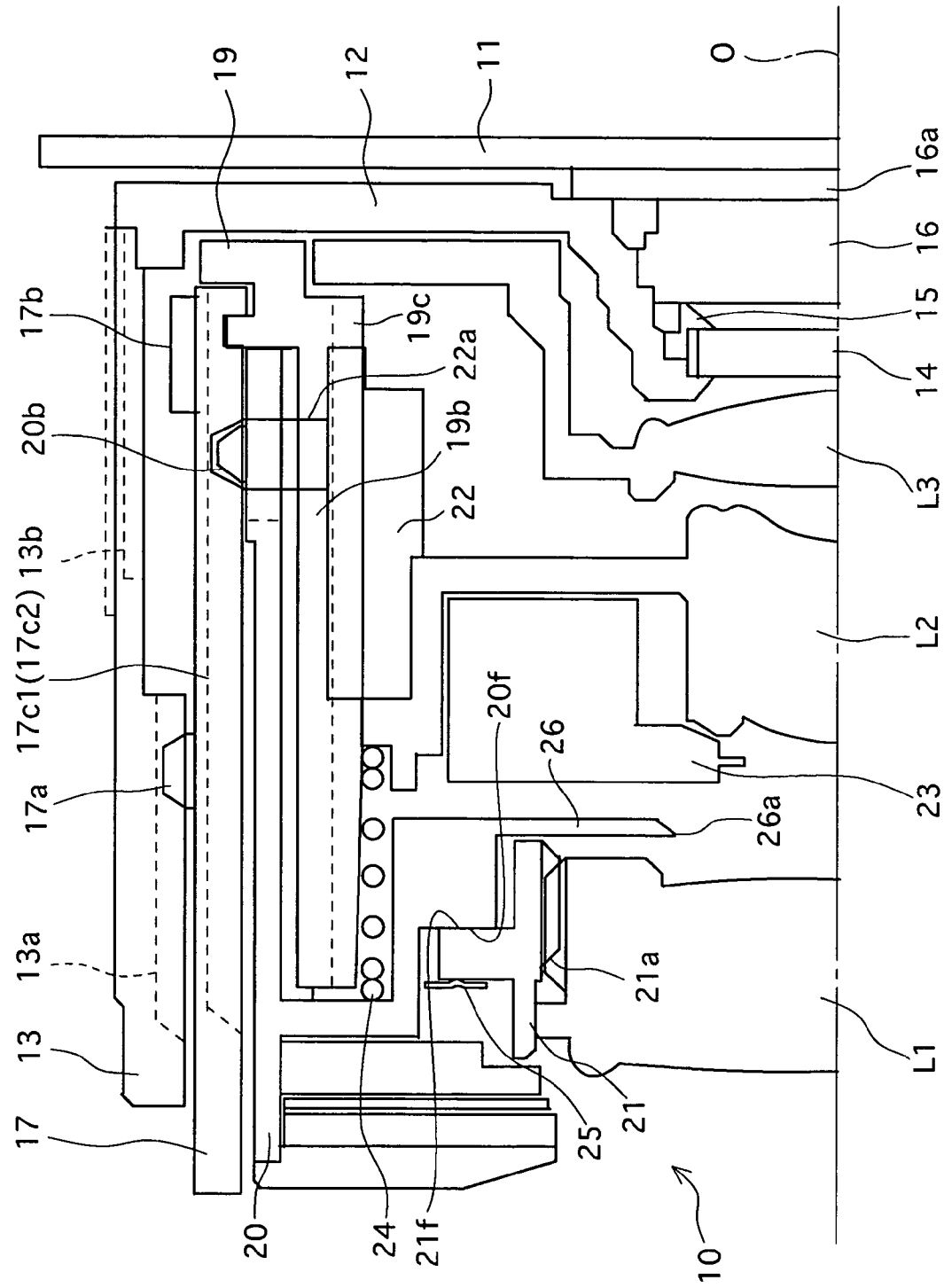
FIG. 6 is a view similar to that of FIG. 1, showing another embodiment of the zoom lens having an eccentricity adjusting device according to the present invention.

Although the first lens group support frame 20 and the fixed aperture plate 26 are separate members in the above illustrated embodiment of the zoom lens, it is possible that the first lens group support frame 20 and the fixed aperture plate 26 be molded of synthetic resin to have a single-piece construction as shown in FIG. 6.

Although the above described embodiment of the photographing lens is a zoom lens, the present invention can also be applied to a photographing lens other than zoom lens. Moreover, the present invention can be applied to a different type of photographing lens in which a lens group of a photographing optical system other than the first lens group serves as an eccentricity adjusting lens group.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A photographing lens comprising:
   an eccentricity adjusting frame which holds an eccentricity adjusting lens group serving as a part of a photographing optical system of said photographing lens;
   a lens support frame, an axis of which is coincident with a predetermined optical axis of said photographing optical system, supporting said eccentricity adjusting frame in a manner to allow said eccentricity adjusting frame to move in a plane orthogonal to said predetermined optical axis during an assembly-stage of the photographing lens; and a fixed aperture member having a circular aperture, said fixed aperture member being integrally formed with said lens support frame so that a center of said circular aperture coincides with said axis of said lens support frame.

2. The photographing lens according to claim 1, wherein said fixed aperture member and said lens support frame are provided as separate members, and said fixed aperture member is fixed to said lens support frame.

3. The photographing lens according to claim 1, wherein said fixed aperture member and said lens support frame are molded in one body.

4. The photographing lens according to claim 1, wherein said photographing lens comprises a zoom lens, wherein said eccentricity adjusting lens group includes a first lens group of said photographing optical system, and wherein said lens support frame includes a first lens group support frame which supports said first lens group and which moves in said optical axis direction in a zooming operation of said zoom lens.

5. The photographing lens according to claim 1, wherein said lens support frame and said eccentricity adjusting frame comprise a first orthogonal surface and a second orthogonal surface which face each other in said optical axis direction, respectively, and are biased in opposite directions to keep said first orthogonal surface and said second orthogonal surface in contact with each other.

6. The photographing lens according to claim 5, further comprising a biasing member, fixed to said lens support frame, for biasing said first orthogonal surface and said second orthogonal surface in said opposite directions.

7. The photographing lens according to claim 1, wherein said fixed aperture member is in the shape of a plate which lies in a plane orthogonal to said optical axis.

8. The photographing lens according to claim 1, further comprising a shutter unit positioned behind said fixed aperture member adjacent thereto.

9. The photographing lens according to claim 1, wherein said eccentricity adjusting lens group is screw-engaged in said eccentricity adjusting frame so that a position of said eccentricity adjusting lens group relative to said eccentricity adjusting frame in said optical axis direction can be adjusted by rotating said eccentricity adjusting lens group relative to said eccentricity adjusting frame in an adjusting operation during assembly of said zoom lens.

10. A photographing lens comprising:

a lens holder which holds a frontmost lens group of a photographing optical system;

a lens-holder support frame which supports said lens holder in a manner to allow said lens holder to move in a plane orthogonal to an optical axis of said photographing optical system during an assembly-stage of the photographing lens, said lens holder and said lens-holder support frame being concentrically arranged; and a fixed aperture member having a circular aperture, said fixed aperture member being integrally formed with said lens-holder support frame so that a center of said circular aperture coincides with an axis of said lens-holder support frame.

\* \* \* \* \*